United States Patent [19]

Willson et al.

[11] 4,396,505
[45] Aug. 2, 1983

[54] FILTRATION SYSTEM PUMP ARRANGEMENT

[75] Inventors: David H. Willson, Farmington Hills; Thomas C. Adams, Farmington, both of Mich.

[73] Assignee: Amsted Industries Incorporated, Chicago, Ill.

[21] Appl. No.: 329,178

[22] Filed: Dec. 10, 1981

[51] Int. Cl.³ ............................................. B01D 29/36
[52] U.S. Cl. ..................................... 210/97; 210/167; 210/196; 210/387; 210/416.1
[58] Field of Search ............... 210/167, 168, 171, 196, 210/387, 406, 416.1, 416.5, 97

[56] References Cited

U.S. PATENT DOCUMENTS

| | | | |
|---|---|---|---|
| 3,087,620 | 4/1963 | Hirs | 210/387 X |
| 3,091,336 | 5/1963 | Hirs | 210/387 X |
| 3,305,094 | 2/1967 | Casson | 210/387 X |
| 3,618,772 | 11/1971 | Dietrick | 210/387 X |
| 3,690,466 | 9/1972 | Lee et al. | 210/387 |
| 3,864,266 | 2/1975 | Dietrick | 210/387 X |
| 4,137,169 | 1/1979 | El-Hindi | 210/406 X |
| 4,159,948 | 7/1979 | Crowe | 210/196 X |

FOREIGN PATENT DOCUMENTS

| | | | |
|---|---|---|---|
| 1295518 | 5/1969 | Fed. Rep. of Germany | 210/387 |
| 361562 | 6/1962 | Switzerland | 210/167 |

Primary Examiner—Robert H. Spitzer
Attorney, Agent, or Firm—Fred P. Kostka; Edward J. Brosius

[57] ABSTRACT

A filtering device including a tank partially located below floor level having a filtrate compartment and a filter means interposed therebetween. Reservoir means and an end suction centrifugal pump means both located substantially on floor level wherein conduit means selectively permits the filtrate level in the reservoir to maintain a positive pressure at the inlet of the pump when pump is shut off, and to neutralize the pressure differential between the filtrate compartment and the tank.

2 Claims, 1 Drawing Figure

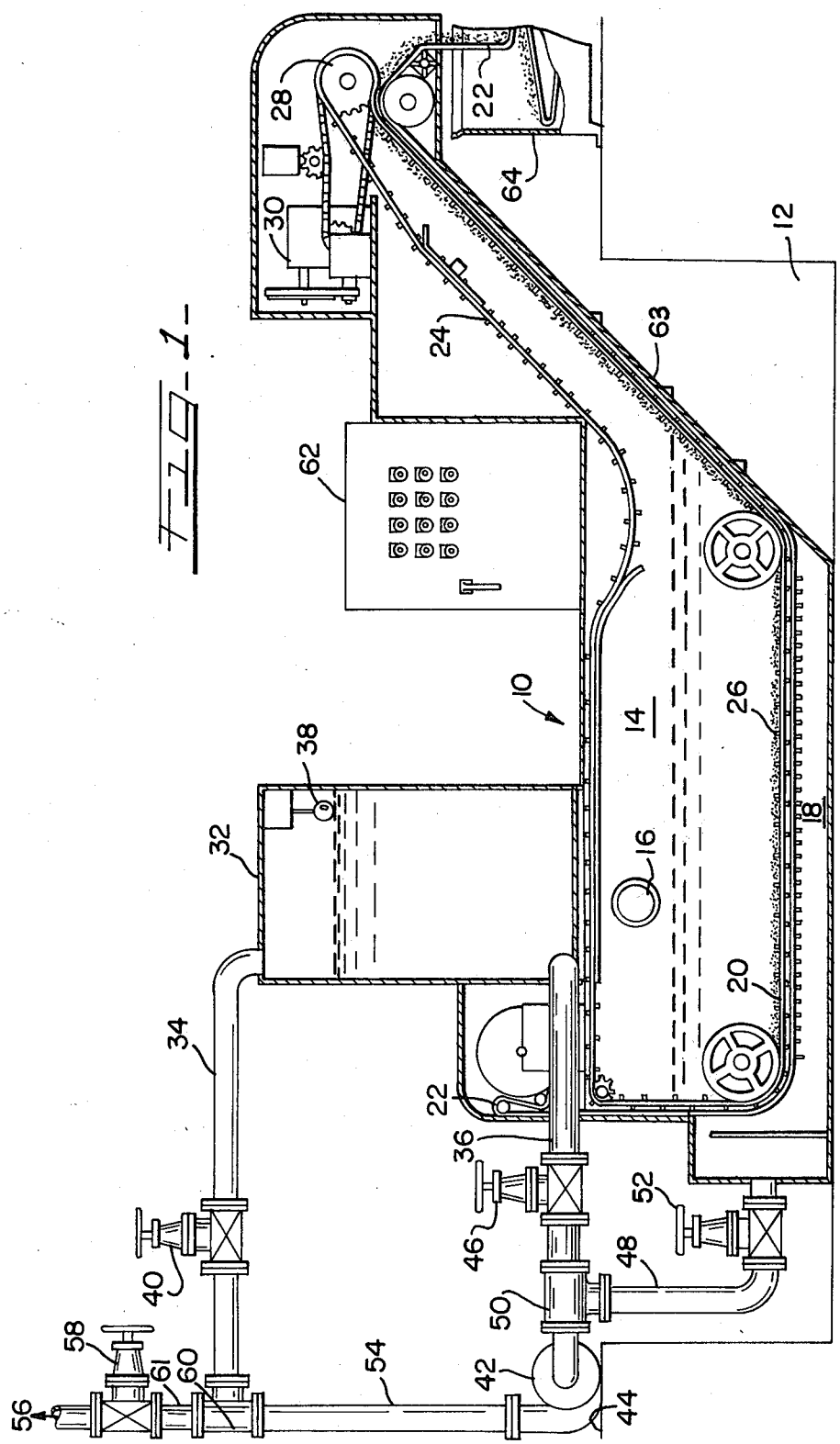

FILTRATION SYSTEM PUMP ARRANGEMENT

FIELD OF THE INVENTION

The present invention relates to a filtering apparatus for separating suspended matter from a liquid suspension and more particularly to a filtering apparatus having an improved filtrate pump arrangement that operates efficiently and economically.

BACKGROUND AND SUMMARY OF THE INVENTION

Filtering apparatus for separating suspended matter from a liquid suspension having a movable filter media is a well known art as exemplified by U.S. Pat. Nos. 3,087,620 and 3,091,336.

The filtering apparatus generally includes a tank for receiving the liquid suspension containing suspended matters. A filtrate compartment is located contiguous to the tank for receiving the clean filtrate. A filter grid supporting a filter media is disposed between the tank and the filtrate compartment so as to permit passage of the filtrate but cause the suspended matter to collect and be deposited on the filter media. A conveyor system is intermittently activated to transport the filter media and the suspended matter deposited thereon up a ramp like end wall of the tank for disposal. A filtrate pump is used to withdraw the filtrate from the filtrates chamber. The pump has an additional function of recirculating clean filtrate back to the tooling machine and induces greater efficiency in the liquid solid separation by continuously removing the clean liquid filtrate from the filtrate compartment causing said compartment to be at a lower pressure than the tank thereby increasing the flow rate across the filter media.

As a result of the pressure differential between the tank and the filtrate compartment, a large force is imposed on the filter media so as to render movement of the filter media by the conveyor difficult. To overcome this difficulty, a reservoir containing a volume of clean filtrate, selectively filled by the filtrate pump, is operatively connected to the filtrate compartment. When the need to advance the filter media arises, the flow valve in a conduit connecting the reservoir to the compartment is opened to allow clean filtrate from the reservoir to neutralize the pressure differential between the filtrate compartment and the tank. This will eliminate the additional force on the filter media so that the conveyor system is effective to advance the filter media including the accumulatable suspended matter for disposal.

Filtering apparatus of the type described above is generally installed in a pit below the floor level. This arrangement is advantageous because trenches can be installed in the floor around the tooling machines that lead directly into the filtering tank. The filtrate which may be a coolant or cutting oil may therefore flow under gravity in the trenches to the tank.

Heretofore, the filtrate pump of an end suction centrifugal construction has been installed at the bottom of the pit and connected directly to the filtrate compartment. In the event of a breakdown, access to the pump located in the pit is awkward so that maintenance of the pump is difficult.

The filtrate pump may also be mounted on the floor level and connected to the suction end of the filtrate compartment in the pit. In this arrangement the pump is located above the liquid level in the filtrate compartment so that a self priming pump has been used in order to achieve proper start-up of the pumping and filtration operation. The self-priming pump is more expensive and less efficient than an end suction centrifugal pump as described in the previous arrangement.

Another known arrangement provides a vertical turbine pump having the impeller section which is located in the pit adjacent to the filtrate compartment and the motor extending vertically above the impeller. Vertical turbine pumps are expensive and require a hoist to assist in removing the pump from the pit when maintenance is required thereby adding more costs to the arrangement. It should be pointed out that all of the prior art arrangements provide a pressure relief conduit, regulated by an automatic vacuum break valve, connecting the reservoir to the filtrate compartment.

By the present invention, it is proposed to provide an end suction centrifugal filtrate pump arrangement which overcomes the difficulties encountered heretofore.

This is accomplished generally by a non self-priming pump located substantially on the same level as the floor level and below the level of the filtrate in the reservoir. Conduit means connect the filtrate compartment, the suction end of the pump and the filtrate reservoir. Valve means are disposed in the conduit means to permit reversal of flow of the filtrate in the latter. The hydraulic pressure of the reservoir maintains a positive liquid pressure at the suction end of the pump when the reservoir discharge valve is open thereby eliminating the need for a self-priming feature pump. The pump draws filtrate from the filtrate compartment with the reservoir discharge valve closed to prevent filtrate flowing out of the reservoir. The reservoir discharge valve is selectively opened to allow filtrate from reservoir to flow into the pump and the filtrate compartment neutralizing the pressure differential therein.

BRIEF DESCRIPTION OF THE DRAWING

In the drawing,

FIG. 1 is a side elevational view of a filtering device showing the pump arrangement of the present invention.

DESCRIPTION OF THE PREFERRED EMBODIMENT

Referring now to the drawing, there is shown a filtering apparatus 10 partially submerged in a below floor level pit 12. Filtering apparatus 10 includes a tank 14 for receiving liquid suspension from a tooling machine (not shown) or the like through an inlet 16. Filtrate compartment 18, of substantially smaller volume than tank 14, is located below tank 14. Filter grid 20 disposed between tank 14 and filtrate compartment 18 carries a disposable or continuous filter media 22 of a suitable fabric of well known construction. A continuous conveyor system 24 comprises a pair of laterally spaced chains (not shown) having a plurality of longitudinally spaced and laterally extending flights 26 attached thereon so that the chains move as an unit. Flights 26 rest on filter media 22 carried by filter grid 20 so that upon longitudinal movement of the flights filter media 22 is dragged in the same direction. Conveyor system 24 is advanced by sprocket and belt assembly 28 driven by motor 30. The sequence of intermittent activation of the conveyor system is to be described hereinafter.

Reservoir 32 is generally carried by tank 14 of the device. It should be understood that reservoir 32 may be supported by other suitable structures located away from tank 14 as specified by the design requirements. Reservoir 32 includes an inlet conduit 34 at the top and a discharge conduit 36 at the bottom. A filtrate level indicator 38 is disposed inside reservoir 32 to provide a signal to an automatic actuated valve 40 in inlet conduit 34. The reservoir inlet valve 40 is normally closed in operation unless a signal is sent from indicator 38 indicating that the reservoir 32 is below a predetermined level the valve is opened until the predetermined level is again achieved. Discharge conduit 36 extends from the bottom of reservoir 32 substantially in a horizontal level to the suction end of a filtrate pump 42. Pump 42 of the non-self-priming type is located on floor level 44 so that liquid level in reservoir 32 is above pump 42. An automatic actuated valve 46 with manual override is installed in a normally closed position in the discharge conduit 36. Reservoir discharge valve 46 is activated and opened when a pressure differential sensor (not shown) registers a pressure differential between tank 14 and compartment 18 that exceeds a predetermined level due to the accumulation of particles deposited on filter media 22, details of operation to be described hereinafter.

As shown in FIG. 1, a conduit 48 connects at one end to filtrate compartment 18 and pump 42 and discharge conduit 36 at the other end through a T-shaped fitting 50. Normally open valve 52 may be installed in the filtrate compartment conduit 48 to provide an emergency shut off. The discharge conduit 54 of pump 42 supplies clean filtrate back to its source such as a tooling machine. Normally open valve 58 may be installed in the pump discharge conduit 54 to provide an emergency shut off. Pump discharge conduit 54 is shown to be in communication with inlet conduit 34 of reservoir 32 by a T-shaped fitting 60 forming a three way junction with clean filtrate supply conduit 61.

In operation, the liquid suspension from the source such as a tooling machine (not shown) is drained into tank 14 through inlet 16 in the side wall thereof. A section of clean filter media 22 collects suspended matter in the liquid suspension thereon so that clean filtrate passes through filter grid 20 into filtrate compartment 18 located below tank 14. Filter pump 42 runs continuously to provide a negative pressure relative to the fluid pressure in tank 14 by drawing filtrate from compartment 18 through conduit 48 thereby inducing flow through the filter media 22. Clean filtrate is discharged in conduit 54 to recirculate back to the source 56. During this procedure, reservoir inlet valve 40 and discharge valve 46 are normally closed.

The suspended matter accumulated on filter media 22 forms a layer of cake resulting in a reduction in flow through the filter media and effecting, and in an increase of pressure differential between tank 14 and compartment 18. A pressure sensor (not shown) sends a signal to control panel 62 when the pressure differential reaches a predetermined level. Control panel 62 relays a signal to activate and open the reservoir discharge valve 46, allowing filtrate to flow from reservoir 32 to both pump 42 and compartment 18. Flow through the conduit 48 is reversed because compartment 18 is in a negative pressure relative to the liquid pressure in reservoir 32. It should be understood that filtrate pump 42 runs continuously during the cycle of filter media advancement. When the pressure differential is reduced a predetermined amount, control means 62 activates motor 30 of conveyor system 24 advancing chains, flights and filter media 22, carrying the suspended matters deposited on the filter media up the ramp-like end wall 63 and dispose same into a bin collector 64 located generally on floor level.

After a section of clean filter media 22 is advanced in place on filter grid 20, reservoir discharge valve 46 is signaled to close, shutting off the flow of filtrate from reservoir 32. Pump 42 continues to draw filtrate from filtrate compartment 18 through conduit 48, repeating the cycle of filtration until the pressure differential is of the predetermined amount to again energize the controls as above described.

Pump 42 occasionally needs to be shut off as in the instance of the end of the weekday operation or in an emergency situation. By the present invention, when pump 42 is shut off, a signal is sent from panel 62 to close reservoir discharge valve 46. Valve 46 is signaled to open just prior to the start up of pump 42 so that most of the filtrate in the reservoir flows through discharge conduit 36 to provide a positive liquid pressure at the pump inlet. The positive liquid pressure is the result of locating the pump inlet at a lower elevation than the filtrate level of reservoir 32. This feature allows pump 42 to be started up without the need for an expensive and less efficient self-priming pump. It should be apparent that reservoir discharge conduit 36 has the capacity to carry a volumetric flow rate greater than the sum of the flow rates of the pump and the filtrate compartment conduit 48. Reservoir 32 is filled when filtrate level is low by means of indicator 38 of reservoir 32 sending a signal to open reservoir inlet valve 40. A filtrate filled reservoir 32 is important to ensure proper priming of pump 42 and neutralizing of pressure differential between filtrate compartment 18 and tank 14.

What is claimed is:

1. A filtering device for separating suspended particles from a liquid suspension including a tank partially located below floor level, a filtrate compartment contiguous to said tank located below said floor level, separating means including a filter means interposed between said tank and said filtrate compartment to separate suspended particles from said liquid suspension, reservoir means for holding a volume of said liquid filtrate received from said filtrate compartment, and having inlet and discharge conduits connected thereto, pump means located substantially on the same level as said floor level above said filtrate chamber, a conduit means having one of its ends connected to said filtrate chamber and other end thereof communicating with said reservoir discharge conduit and inlet of said pump means, and normally closed flow control means in said conduit for directing flow of filtrate when open from said reservoir toward said pump means, whereby said liquid filtrate in said reservoir means provides a positive liquid pressure at said inlet of said pump means so as to prime said pump means in a start-up operation.

2. The filtering device as described in claim 1 wherein said flow control means comprises valve means disposed in said discharge conduit means so that closing said valve means in said discharge conduit permits liquid filtrate to flow from said filtrate compartment to said operating pump means.

* * * * *